Feb. 17, 1925.  
L. SAIVES  
1,526,719  
AUTOMATIC CHANGE SPEED GEAR.  
Filed Feb. 20, 1923  
2 Sheets-Sheet 1
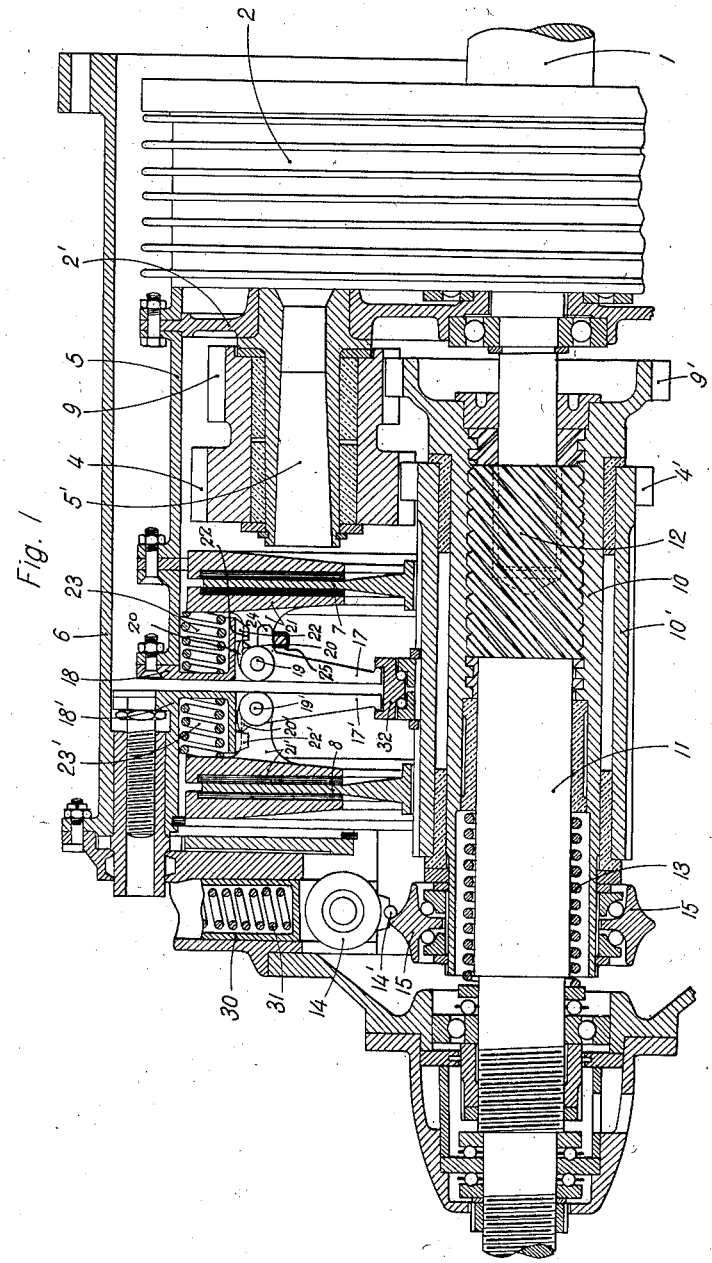
INVENTOR  
Leon Saives  
by Chas J. Hill  
ATTORNEY

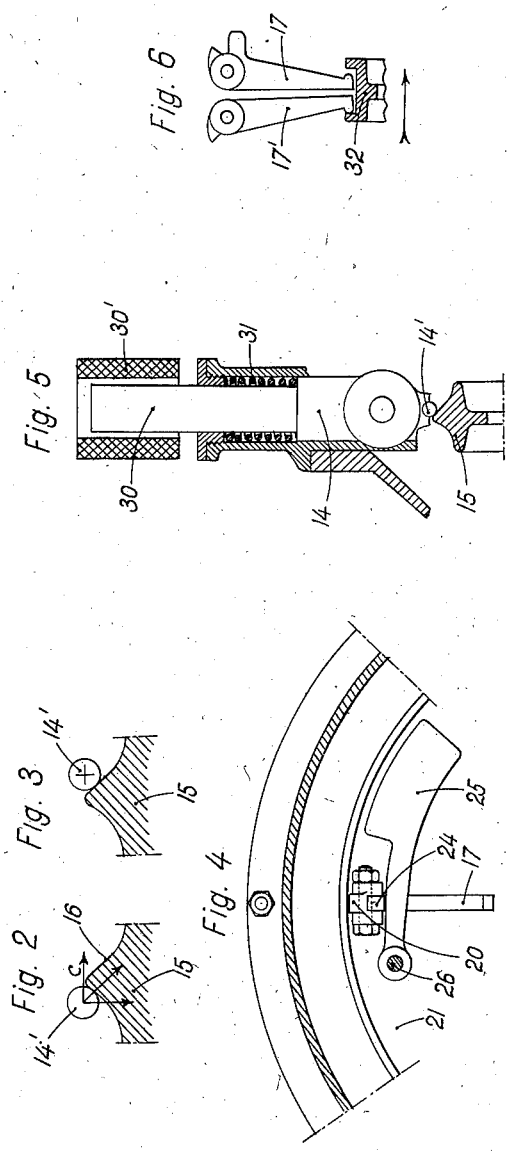

Patented Feb. 17, 1925.

1,526,719

UNITED STATES PATENT OFFICE.

LÉON SAIVES, OF BILLANCOURT, FRANCE.

AUTOMATIC CHANGE-SPEED GEARS.

Application filed February 20, 1923. Serial No. 620,213.

*To all whom it may concern:*

Be it known that I, LÉON SAIVES, citizen of the French Republic, residing at Billancourt, Department of the Seine, in France, and having P. O. address 15 Rue Gustave Sandoz, in the said city, have invented certain new and useful Improvements in or Relating to Automatic Change-Speed Gears; and I do hereby declare the following to be a full, clear, and exact description of the invention, such as will enable others skilled in the art to which it appertains to make and use the same.

The present invention relates to a change speed gear for automobile vehicles and has for its object to provide a device for automatically effecting the operation of clutching and of change speed.

In order that the invention may be clearly understood reference is made to the accompanying drawing which shows by way of example a construction in accordance with the present invention.

Figure 1 is a cross section of the automatic change speed gear in accordance with the invention.

Figures 2, 3 and 6 are diagrammatic views of details of the arrangement.

Figure 4 is a detail view of one of the masses which act by centrifugal force on certain parts of the arrangement.

Figure 5 is a sectional view of a modification of the tappets which affect the position of the nut.

Referring to Figure 1, which shows only a half section of the apparatus, the following form the essential parts of the change speed gear of which the motor shaft is indicated at 1 and the driven shaft at 11.

Before describing in detail the said members, it may be remarked that the motor shaft comprises a centrifugally actuated automatic clutch 2, shown in elevation of any well known type in order to obtain automatic and progressive starting. A clutch of this type completely avoids the use of the clutch pedal because it is sufficient to start the motor at its minimum speed in order to obtain automatic clutching. A clutch of this class may be found advantageous, and although conventionally shown in the drawings as forming part of the apparatus as a whole, is not one of the distinctive features of the invention and consequently is not claimed.

The change speed gear comprises an epicycloidal train of gearing of a known type by means of which two changes of speed can be obtained. It comprises the planetary pinions 9 and 4 integral with or rigidly connected to each other and loosely mounted as usual on a pin 5', which is riveted to the part 2', the latter being itself rigidly connected to the part 5 which is actuated by the motor shaft when the clutch 2 is in engagement.

The pinion 9' is rigid with a cylindrical nut 10 the integral cylindrical part of which is screw threaded for a certain length, thus forming a nut for a corresponding screw 12 integral with or rigidly connected by any suitable means to the driven shaft 11. The pitch of the said screw is obviously such that the nut will fulfil the desired function.

At the opposite end of the pinion 9' the hub or nut 10 is fitted with a member 15 of a particular form mounted on ball bearings. the function of which is hereinafter described. A spring 13 coiled on the driven shaft 11 tends to displace the nut 10 constantly towards the right hand side of Figure 1. Disposed concentrically above the nut 10 and axially rigid with the latter is a second hub 10', forming an extension of the pinion 4'. Discs 7 and 8 are mounted on this hub which forms part of a disc clutch capable of sliding without turning on the hub 10'. Keyed on the same hub between the two clutches is a control sleeve 32 for the clutches. In the sleeve are provided two levers 17—17' to control the said clutches when the clutches are in engagement therewith.

The disc 7 forms part of the right hand clutch of which the other parts are rigid with the movable part 5 which latter is actuated by the motor. The part 21 of the said clutch can slide without turning in such manner as to compress the disc 7 when it engages therewith. Springs 23 placed in suitable casings rigid with the movable part 5 tend to thrust the part 21 towards the right. The control lever 17 is articulated at 19 on a rigid part of 21 and a cam-like projection 20, rigid with the lever, is adapted to bear on a part 22 projecting from the part 18 which is rigidly secured to the movable part 5. It follows therefrom that the displacement towards the left of the lever 17 by reason of its point of support on the piece 18 has the effect of drawing towards the left the part 21 of the clutch in spite of the tension of the spring 23 and thus tends to effect declutching. It will thus be seen how this action is reinforced by reason of an arrangement actuated by centrifugal force which is hereinafter described.

The lever 17' is mounted in a similar manner on the piece 21' of the left hand clutch; it is articulated at 19'. A small cam-like projection is provided at 20' and another small projection at 22', the latter being rigid with the part 18' which is rigidly fixed to the fixed part 6 of the apparatus. Springs 23' are arranged in suitable housings rigid with 18'. For this clutch, any displacement of the lever 17' towards the right will have the effect of drawing the part 21' of the clutch towards the right, thus causing declutching of the latter in spite of the tension of the spring 23'.

There may be three, six, or other suitable number of pairs of levers according to requirements.

From the foregoing it will be seen that any displacement of the sleeve 32 in one direction or in the other will cause clutching of one of the clutches and at the same time the disengagement of the other and vice versa.

Disposed radially above the part 15 are a certain number of tappet rods 14, the number of such rods being, say, from three to six and each being provided with a roller 14' each rod being mounted in the small cylinder guide 30 in the interior of which is arranged the spring 31 which acts in such manner as to constantly force the tappet rod 14 against the part 15. This latter comprises two cam faces of suitable form, the function of which is hereinafter described. It must be understood that the disc brakes indicated may be of any other system without changing the characteristic features of the invention.

As is known, in a change speed gear of the planetary type described, if the central pinions be locked either to the movable part 5 or to the fixed part 6, direct engagement or low speed will be obtained.

The action is as follows:

The control of the brakes is effected by displacing the sleeve 32 and it follows that it is sufficient to displace the nut 10 in order to obtain this result since it is longitudinally rigid with the hub 10' and consequently with the sleeve.

For a definite value of the motor couple and consequently of the resistant couple the nut 10 is maintained in a position of equilibrium by reason of the simultaneous actions exerted, firstly, by the spring 13 which acts directly on the nut or hub 10, and secondly, by the spring-pressed tappet rods 14 which act on the left hand cam faces of suitable profile on the part 15, as indicated in Figure 2 where the horizontal component $c$ is also indicated.

These opposed resistances have also the effect of maintaining one of the two brakes locked, the other being consequently in gear. The profile of the cams on the part 15 is such that the neutral point can pass under the roller 14' and the immobilization by braking of the central pinion 4' can be ensured.

It has already been stated that the action of the right hand clutch, direct drive, was reinforced by an arrangement acting under centrifugal force. This arrangement is indicated in Figure 4. To the rotatable part 5 are secured heavy masses 25 capable of pivoting about an axis 26 rigid either with the frame 21, as indicated or with the part 18 which is connected rigidly to the part 5. On the lever 17 of the clutch is provided a small arm 24, on which the masses 25 are adapted to act when the speed exceeds a definite maximum value.

The action of the masses 25 becomes effective when the resistance of the vehicle to forward movement diminishes, the speed of the motor naturally then increasing. This action will become augmented simultaneously to that of the balanced spring 13 and the brake springs 23. The balance will be interrupted between the opposed forces which permits of the change from reduced speed to that of the direct drive.

The contour of the cam on the part 15, Figure 2, when the arrangement is in direct drive is such that the tappet rod 14 may then be clear of the apex or top of the cam piece 15, the tappet rod being then in the neutral position indicated in Figure 3. The tappet rods are no longer in opposition in this position to the displacement of the nut 10, but their action on the one hand is added to that of the nut in order to effect clutching of the brake 8 at low speed.

It may be remarked that the action of the masses 25 assists by reason of centrifugal action to raise the tappet rods 14 through the part 16 of the cam on the part 15 indicated in Figure 2.

As a modification, it may be remarked that the action of the masses 25 due to centrifugal force could be replaced by an electromagnetic arrangement, a diagrammatical indication of which is given in Figure 5.

The electromagnets 30' could be arranged round the guides 30 of the tappet rods 14. Their action would then be contrary to that of the springs 31 and no action will be felt on the cam on the part 15 at the moment of changing to direct drive.

This arrangement is given only by way of example as the electromagnets could be disposed in any other suitable manner to obtain the desired result.

It is evident to any expert in the art that modifications in details in an apparatus of this type are quite possible without departing from the nature of the invention. The brakes, for example, could be of any other type than those indicated and the assembly and mounting of the principal parts may be altered to meet requirements.

Claims:

1. An automatic change speed gearing for automobiles comprising a rotatable driving shaft, a casing member adapted to rotate therewith, a planetary pinion shaft on said casing member, planetary pinions on said shaft and fixed to each other, a stationary member, a driven shaft carried thereby and having a driving hub axially movable thereon, a pinion on said hub in mesh with one of said planetary pinions, a control hub rotatably mounted on said driving hub and axially movable therewith and having a pinion meshing with another of said planetary pinions, a clutch associated with said control hub and with said stationary member, a clutch associated with said control hub and with said rotatable casing member, a sleeve on said control hub, clutch control levers associated with said sleeve and with said clutches, and speed controlled means adapted to move said sleeve axially for effecting operation of either of said clutches.

2. An automatic change speed gearing for automobiles comprising a rotatable driving shaft, a casing member adapted to rotate therewith, a planetary pinion shaft on said casing member, planetary pinions on said shaft and fixed to each other, a stationary member, a driven shaft carried thereby and having a driving hub axially movable thereon, a pinion on said hub in mesh with one of said planetary pinions, a control hub rotatably mounted on said driving hub and axially movable therewith and having a pinion meshing with another of said planetary pinions, a clutch associated with said control hub and with said stationary member, a clutch associated with said control hub and with said rotatable casing member, a sleeve on said control hub, clutch control levers associated with said sleeve and with said clutches, and speed controlled means adapted to move said sleeve axially for effecting operation of either of said clutches, said means including weighted levers pivoted on one of said clutches and associated with said clutch control levers.

3. An automatic change speed gearing for automobiles comprising a driving shaft, a casing rotatable therewith, planetary gearing carried by said casing, a stationary member, a driven shaft mounted therein and having a threaded portion, an internally threaded driving hub on said threaded portion of said driven shaft and having a pinion meshing with said planetary gearing, spring means urging said driving hub in one direction axially, a cam collar associated with said driving hub, means on said stationary member associated with said collar and adapted to urge said collar in either direction axially, a control hub rotatably mounted on said driving hub and meshing with said planetary gearing, and clutches for securing said control hub either to said stationary member or to said rotatable casing.

4. An automatic change speed gearing for automobiles comprising a driving shaft, a casing rotatable therewith, planetary gearing carried by said casing, a stationary member, a driven shaft mounted therein and having a threaded portion, an internally threaded driving hub on said threaded portion of said driven shaft and having a pinion meshing with said planetary gearing, spring means urging said driving hub in one direction axially, a cam collar associated with said driving hub, means on said stationary member associated with said collar and adapted to urge said collar in either direction axially, a control hub rotatably mounted on said driving hub and meshing with said planetary gearing, clutches for securing said control hub either to said stationary member or to said rotatable casing, a clutch control sleeve on said control hub, levers associated with said clutches and with said sleeve, and speed controlled means associated with said levers for moving said sleeve to actuate either of said clutches.

In testimony whereof I affix my signature.

LÉON SAIVES.